US010750507B2

(12) United States Patent
Majmundar et al.

(10) Patent No.: US 10,750,507 B2
(45) Date of Patent: *Aug. 18, 2020

(54) FACILITATING MOBILE DEVICE-ASSISTED MOBILITY ENHANCEMENT TO IMPROVE USER PLANE INTERRUPTION TIME

(71) Applicant: AT&T Intellectual Property I, L.P., Atlanta, GA (US)

(72) Inventors: Milap Majmundar, Austin, TX (US); Thomas Novlan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,498

(22) Filed: Oct. 30, 2019

(65) Prior Publication Data
US 2020/0068550 A1 Feb. 27, 2020

Related U.S. Application Data

(63) Continuation of application No. 15/721,258, filed on Sep. 29, 2017, now Pat. No. 10,499,398.

(51) Int. Cl.
H04W 36/06 (2009.01)
H04W 72/04 (2009.01)
(Continued)

(52) U.S. Cl.
CPC ..... H04W 72/046 (2013.01); H04W 36/0069 (2018.08); H04W 36/06 (2013.01);
(Continued)

(58) Field of Classification Search
CPC .................................................. H04W 72/046
(Continued)

(56) References Cited

U.S. PATENT DOCUMENTS 5,937,019 A   8/1999 Padovani
6,128,486 A   10/2000 Keskitalo et al.
(Continued)

FOREIGN PATENT DOCUMENTS

CA   2975069 A1   8/2016
CN   101185200 B   7/2011
(Continued)

OTHER PUBLICATIONS

Non-Final Office Action received for U.S. Appl. No. 15/587,388 dated Feb. 13, 2020, 84 pages.
(Continued)

Primary Examiner — Joel Ajayi
(74) Attorney, Agent, or Firm — Amin, Turocy & Watson, LLP

(57) ABSTRACT

Mobile device-assisted mobility enhancement is provided. In one example, a method comprises: determining, by a mobile device that was communicatively coupled to a defined network via a first distribution unit (DU) of DUs, that a connection between the mobile device and a base station device, via a first beam, in a network fails to satisfy a defined condition; selecting a second beam associated with a second DU and to which to connect; and transmitting, via the second beam, to the defined network, a radio link interruption message comprising re-assignment information to facilitate re-assignment of the mobile device to the second beam from the first beam, wherein the transmitting is performed via a mobile device identification message of a random access procedure and wherein the transmitting is performed based on the first DU being determined to be different from the second DU.

20 Claims, 10 Drawing Sheets

(51) Int. Cl.
*H04W 36/00* (2009.01)
*H04W 74/08* (2009.01)
*H04W 84/04* (2009.01)
*H04B 17/318* (2015.01)
*H04W 12/04* (2009.01)

(52) U.S. Cl.
CPC ........... *H04B 17/318* (2015.01); *H04W 12/04* (2013.01); *H04W 72/0413* (2013.01); *H04W 74/0833* (2013.01); *H04W 84/042* (2013.01)

(58) Field of Classification Search
USPC ........................................................ 370/329
See application file for complete search history.

(56) References Cited

U.S. PATENT DOCUMENTS

| | | | |
|---|---|---|---|
| 6,167,286 | A | 12/2000 | Ward et al. |
| 6,871,071 | B2 | 3/2005 | Takao et al. |
| 7,079,843 | B2 | 7/2006 | Iacono et al. |
| 7,242,955 | B2 | 7/2007 | Frank et al. |
| 7,308,264 | B2 | 12/2007 | Stern-berkowitz et al. |
| 7,324,817 | B2 | 1/2008 | Iacono et al. |
| 7,460,834 | B2 | 12/2008 | Johnson et al. |
| 8,238,835 | B2 | 8/2012 | Nagai et al. |
| 8,244,254 | B2 | 8/2012 | Kashiwase |
| 8,265,702 | B2 | 9/2012 | Iacono et al. |
| 8,280,375 | B2 | 10/2012 | Du et al. |
| 8,750,896 | B2 | 6/2014 | Brisebois et al. |
| 9,094,977 | B2 | 7/2015 | Li et al. |
| 9,319,890 | B2 | 4/2016 | Brisebois et al. |
| 9,344,234 | B2 | 5/2016 | Lin et al. |
| 9,444,692 | B2 | 9/2016 | Lehane |
| 9,491,764 | B1 | 11/2016 | Ross et al. |
| 9,497,673 | B2 | 11/2016 | Blankenship |
| 9,578,671 | B2 | 2/2017 | Blankenship |
| 9,596,612 | B2 | 3/2017 | Brisebois et al. |
| 9,674,852 | B2 | 6/2017 | Heo |
| 9,699,802 | B2 | 7/2017 | Vannithamby |
| 10,021,597 | B2 | 7/2018 | Majmundar |
| 10,206,142 | B2 | 2/2019 | Majmundar |
| 2001/0018342 | A1 | 8/2001 | Vialen et al. |
| 2006/0246907 | A1 | 11/2006 | Kaikkonen et al. |
| 2006/0276229 | A1 | 12/2006 | Braun et al. |
| 2011/0021154 | A1 | 1/2011 | Marinier et al. |
| 2012/0213106 | A1 | 8/2012 | Boehm |
| 2013/0040692 | A1 | 2/2013 | Chen et al. |
| 2013/0121185 | A1* | 5/2013 | Li ..................... H04W 72/046 370/252 |
| 2014/0073337 | A1* | 3/2014 | Hong ................ H04W 16/28 455/452.1 |
| 2014/0192740 | A1 | 7/2014 | Ekpenyong |
| 2014/0247731 | A1 | 9/2014 | Nagaraj |
| 2014/0293896 | A1 | 10/2014 | Kuo |
| 2014/0342748 | A1 | 11/2014 | Zou |
| 2015/0139195 | A1 | 5/2015 | Xiao et al. |
| 2015/0181473 | A1 | 6/2015 | Horn |
| 2015/0215912 | A1 | 7/2015 | Jha |
| 2015/0256300 | A1 | 9/2015 | Lin et al. |
| 2015/0318916 | A1* | 11/2015 | Gopal ................ H04B 7/18508 455/13.1 |
| 2015/0382290 | A1 | 12/2015 | Yaacoub |
| 2016/0057800 | A1 | 2/2016 | Ingale |
| 2016/0066233 | A1 | 3/2016 | Balachandran |
| 2016/0095004 | A1 | 3/2016 | Tseng |
| 2016/0150435 | A1 | 5/2016 | Baek et al. |
| 2016/0198383 | A1 | 7/2016 | Worrall |
| 2016/0234714 | A1 | 8/2016 | Basu |
| 2016/0255665 | A1 | 9/2016 | Futaki |
| 2016/0353510 | A1 | 12/2016 | Zhang et al. |
| 2016/0381609 | A1 | 12/2016 | Alriksson et al. |
| 2017/0006539 | A1 | 1/2017 | Kakishima et al. |
| 2017/0019903 | A1 | 1/2017 | Talukdar et al. |
| 2017/0041968 | A1 | 2/2017 | Jin |
| 2017/0071023 | A1 | 3/2017 | Kunz |
| 2017/0164281 | A1 | 6/2017 | Chiba |
| 2017/0188248 | A1 | 6/2017 | Muller |
| 2017/0289867 | A1 | 10/2017 | Fan et al. |
| 2018/0091262 | A1 | 3/2018 | Jung et al. |
| 2018/0199328 | A1 | 7/2018 | Sang et al. |
| 2018/0212651 | A1 | 7/2018 | Li et al. |
| 2018/0249526 | A1 | 8/2018 | Nagaraja et al. |
| 2019/0174355 | A1 | 6/2019 | Majmundar |

FOREIGN PATENT DOCUMENTS

| | | |
|---|---|---|
| EP | 3 120 659 A2 | 1/2017 |
| EP | 2 995 163 B1 | 3/2017 |
| EP | 3 178 290 A1 | 6/2017 |
| KR | 100749448 B1 | 8/2007 |
| KR | 20180033017 A | 4/2018 |
| WO | 2015/018494 A1 | 2/2015 |
| WO | 2016/055102 A1 | 4/2016 |
| WO | 2016/180612 A1 | 11/2016 |
| WO | 2016/198124 A1 | 12/2016 |
| WO | 2017/010644 A1 | 1/2017 |
| WO | 2017/034607 A1 | 3/2017 |

OTHER PUBLICATIONS

U.S. Appl. No. 15/721,258, filed Sep. 29, 2017.
Capone et al., "Context information for fast cell discovery in mm-wave 5G networks." European Wireless 2015; 21th European Wireless Conference; Proceedings of VDE, 2015. https://arxiv.org/pdf/1501.02223. Retrieved on May 22, 2017, 6 pages.
Shariat et al. "5G radio access above 6 GHz." Transactions on Emerging Telecommunications Technologies 27.9 (2016): 1160-1167. http://eprints.networks.imdea.org/1532/1/5G_radio_access_above_6GHz_2016_EN.pdf. Retrieved on May 22, 2017, 8 pages.
Giordani et al. "Uplink-based framework for control plane applications in 5G mmWave cellular networks." arXiv preprint arXiv:1610.04836 (2016). https://arxiv.org/pdf/1610.04836. Retrieved on May 22, 2017, 31 pages.
Halbauer et al. "Architectural aspects of mm-wave radio access integration with 5G ecosystem." 5G PPP mmMAGIC, 2016. http://eprints.networks.imdea.org/1533/1/mm-wave_architecture_white_paper.pdf. Retrieved on May 22, 2017, 17 pages.
Gimenez, "Mobility Management for Cellular Networks: From LTE Towards 5G" Jan. 2017, 308 pages.
Halbauer et al. "Millimetre-Wave Based Mobile Radio Access Network for Fifth Generation Integrated Communications", Jun. 30, 2017, 85 pages.
Rugeland et al., "Architectural enablers and concepts for mm-wave RAN integration" 5G PPP mmMAGIC, Mar. 29, 2017, 26 pages.
Thapliyal, "Mobility Robustness in 5G Networks" Aalto University School of Electrical Engineering Aug. 12, 2016, 58 pages.
Ericsson, "Mechanism for fast retransmission of lost PDUs" 3GPP TSG-RAN WG3 #97, Tdoc R3-173235, Berlin, Germany, Aug. 21-25, 2017, 5 pages.
Ericsson, "0 ms interruption support during handover procedure in NR" 3GPP TSG-RAN WG2 #99, R2-1708028 (Resubmission of R2-1706625), Berlin, Germany, Aug. 21-25, 2017, 7 pages.
Majmundar et al., "Inter-Distributed Unit Beam Switch Procedure Triggered by Radio Link Interruption", Unpublished U.S. Appl. No. 15/587,388, filed May 4, 2017, AT&T, 27 pages.
Office Action for U.S. Appl. No. 15/587,237 dated Sep. 4, 2018, 45 pages.
Office Action for U.S. Appl. No. 15/721,258 dated Oct. 29, 2018, 30 pages.
Office Action dated Nov. 27, 2018 for U.S. Appl. No. 15/587,388, 63 pages.
Final Office Action received for U.S. Appl. No. 15/587,237 dated Mar. 20, 2019, 47 pages.
Final Office Action received for U.S. Appl. No. 15/721,258 dated Mar. 11, 2019, 20 pages.
Singh, et al. "Proportional Fair Traffic Splitting and Aggregation in Heterogeneous Wireless Networks." arXiv:1508.05542v2 [cs.NI] Mar. 26, 2016. 4 pages.

(56) References Cited

OTHER PUBLICATIONS

3rd Generation Partnership Project. "3GPP TR 38.912 V1.0.0: Study on New Radio (NR) Access Technology." 3GPP, Mar. 2017. 74 pages.
Non-Final Office Action received for U.S. Appl. No. 15/587,237 dated Jul. 12, 2019, 38 pages.
Final Office Action received for U.S. Appl. No. 15/587,388 dated Jun. 17, 2019, 75 pages.
Final Office Action received for U.S. Appl. No. 15/587,388 dated May 29, 2020, 94 pages.

* cited by examiner

FACILITATING MOBILE DEVICE-ASSISTED MOBILITY ENHANCEMENT TO IMPROVE USER PLANE INTERRUPTION TIME

RELATED APPLICATION

The subject patent application is a continuation of, and claims priority to, U.S. patent application Ser. No. 15/721,258, filed Sep. 29, 2017, and entitled "FACILITATING MOBILE DEVICE-ASSISTED MOBILITY ENHANCEMENT TO IMPROVE USER PLANE INTERRUPTION TIME," the entirety of which application is hereby incorporated by reference herein.

TECHNICAL FIELD

The subject disclosure relates generally to communications systems, and, for example, to systems, methods and/or machine-readable storage media for facilitating mobile device-assisted mobility enhancement to improve user plane interruption time in a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
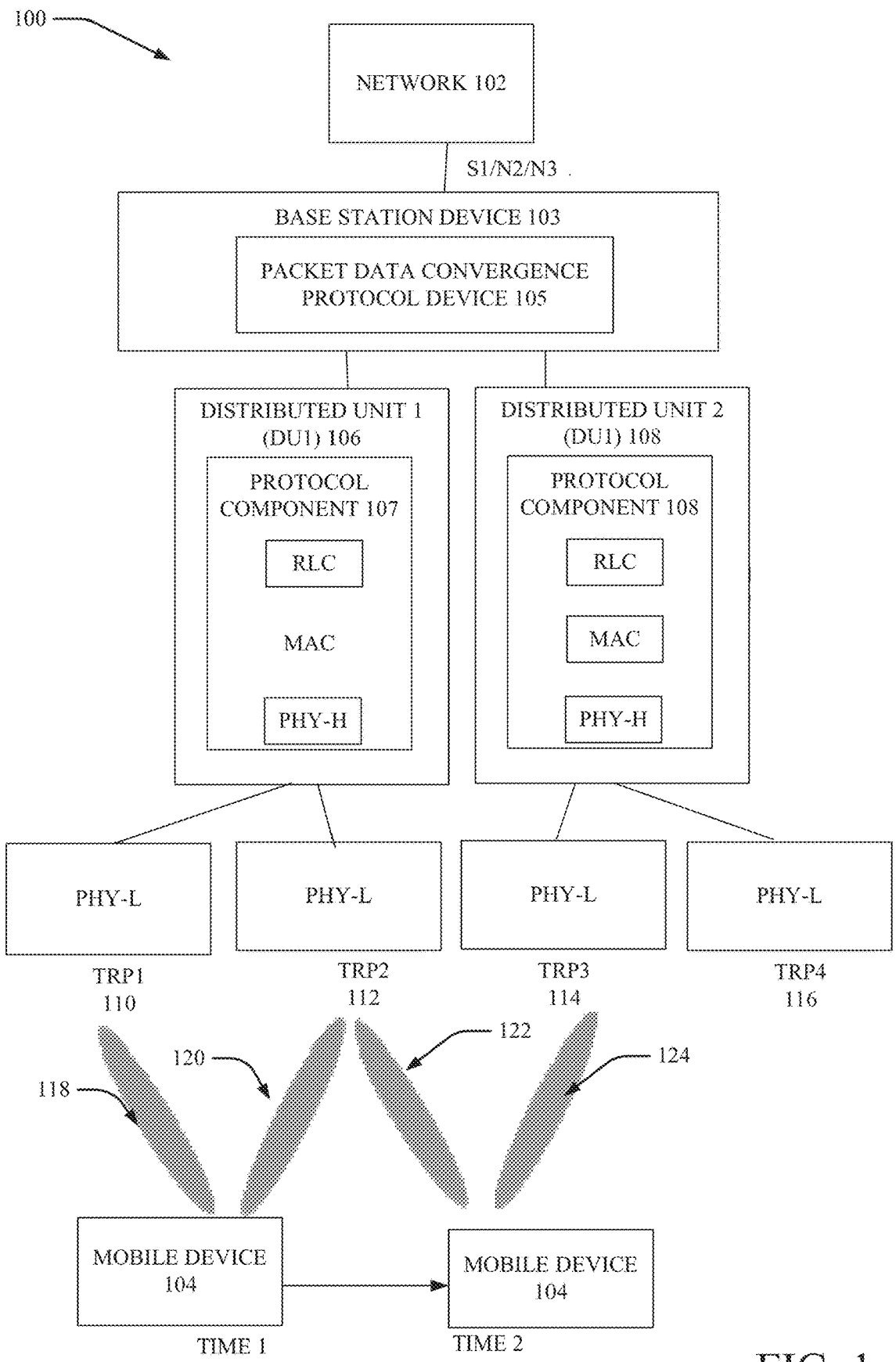
FIG. 1 illustrates an example, non-limiting network architecture to facilitate mobile device-assisted mobility enhancement to improve user plane interruption time in a wireless communication system in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)," "gNB" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

To meet the huge demand for data centric applications, currently 3GPP is looking towards extending the current 4G standards to 5G. However, there are numerous challenges and/or issues that are expected to arise. As used herein, "5G" can also be referred to as New Radio (NR) access. One or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE. Typically, the following information can be transmitted based on the downlink control information (DCI) format: Localized/Distributed virtual resource block (VRB) assignment flag, resource block assignment, modulation and coding protocol, HARQ process number, new data indicator, redundancy version, transmit power control (TPC) command for uplink control channel, downlink (DL) assignment index, precoding matrix index and/or number of layers.

Systems, methods and/or machine-readable storage media for facilitating mobile device-assisted mobility enhancement to improve user plane interruption time in a wireless communication system are provided herein. In some embodiments, the mobile device-assisted mobility procedure can enable smaller user-plane interruption time and data recovery in millimeter (mm)Wave-based 5G networks with frequent and sudden signal blockages.

One or more embodiments can provide a new mobile device-assisted method of triggering a dual/multi connectivity secondary node addition process based on a message sent by the mobile device to the network to help the network determine the best target distribution unit (DU) for secondary node addition. As used herein, the terms "distribution unit" and "distribution device" can be interchangeable, have the same meaning and refer to the same device. As such, a first distribution unit means the same device as a first distribution device. A second distribution unit means the same device as a second distribution device.

In millimeter Wave (mmWave)-based 5G networks that may experience frequent blockage of beam pair links (BPLs), the mobile device may have the best view on available BPLs, and when an available BPL belongs to a different distributed unit or cell, the proposed methods described herein may help reduce the amount of user plane interruption time compared to a traditional handover procedure. As used herein, the terms "beam pair links" and "beams" can be interchangeable. In wireless communication systems that use both downlink and uplink beamforming, the link can be established by using one beam from the BS device pointing towards the mobile device and one beam from the mobile device pointing towards the BS device. As such, it takes two beams to complete the communication link. This set of two beams is indicated herein as "beam pair link." As used herein, in various embodiments, the term "beam" (or "beams") can represent the communication link (on the uplink and downlink) established between the mobile device and the BS device using beams, the communication link established from the BS device to the mobile device and/or the communication link established from the mobile device to the BS device using a beam. All such embodiments are envisaged.

Additionally, the embodiments can also be extended to be used on a per-service basis, thereby enabling faster recovery of services with different quality of service (QoS) requirements when the different services are being supported by different sets of transmission points in the network.

One or more embodiments can involve the mobile device and/or network detecting that the available beam pair link belongs to a different distributed unit or cell, and the mobile device sending a radio link interruption (RLI) message to the network with appropriate identification information to allow the network to add a new dual/multi-connectivity leg via the new DU or cell in order to continue the interrupted data session to the mobile device.

One or more embodiments can enable faster recovery of lost connectivity in situations in a scenario where the network may not have reliable radio link measurements from all available beams visible to the mobile device. This may be the case, for example, in mmWave frequency based 5G network deployments in dense busy urban areas, where dynamically changing environments may cause sudden and frequent signal blockages. In such environments, the mobile device may be in the better position to determine which beam pair links it can see best.

One or more embodiment can: allow the mobile device to assist the network by exploiting this information, thereby improving how quickly a mobile device recovers from a lost connection; allow indicating radio link interruption to the network on a per-service basis to allow faster recovery for that service; and/or enable lossless mobility by allowing retransmissions of pending packet data convergence protocol (PDCP) packet data units (PDUs) from the older DU.

In one embodiment, a method comprises: determining, by a mobile device comprising a processor and that was communicatively coupled to a network via a first distribution device of distribution devices, that a connection, via a first beam, between the mobile device and a base station device of the network fails to satisfy a defined condition; selecting, by the mobile device, a second beam associated with a second distribution device of the distribution devices and to which to connect based on the second beam being determined to satisfy the defined condition; and transmitting, by the mobile device, via the second beam, to the base station device, a radio link interruption message comprising re-assignment information to facilitate re-assignment of the mobile device to the second beam from being assigned to the first beam, wherein the transmitting is performed via a mobile device identification message of a random access procedure to facilitate the re-assignment from the first beam to the second beam, wherein the mobile device identification message identifies the mobile device, and wherein the transmitting is performed based on the first distribution device being determined to be different from the second distribution device.

In another embodiment, a machine-readable storage medium is provided. The machine-readable storage medium can comprise executable instructions that, when executed by a processor of a mobile device, facilitate performance of operations, comprising: determining that a connection, via a first beam, between the mobile device and a base station device of a network fails to satisfy a defined condition, wherein the mobile device was communicatively coupled to the network via a first distribution device of distribution devices; based on a second beam being determined to satisfy the defined condition, selecting the second beam to which to connect and that is associated with a second distribution device of the distribution devices; and transmitting, via the second beam to the base station device, a radio link interruption message comprising re-assignment information to facilitate re-assignment of the mobile device to the second beam from being assigned to the first beam, wherein the transmitting is performed via a mobile device identification message of a random access procedure to facilitate the re-assignment from the first beam to the second beam, wherein the mobile device identification message identifies the mobile device, and wherein the transmitting is performed based on the first distribution device being determined to be different from the second distribution device.

In yet another embodiment, a network device is provided. The network device can comprise: a processor; and a memory that stores executable instructions that, when executed by the processor, facilitate performance of operations, comprising: receiving, from a mobile device, a radio interruption link message in a mobile device identification message of a random access channel procedure requesting re-assignment of the mobile device from a first beam to a second beam, the requesting the re-assignment being based on the first beam failing to satisfy a defined condition regarding signal strength and based on a determination that a first distribution device that provided the first beam is different from a second distribution device that provided the second beam, wherein the radio interruption link message comprises information to identify the second distribution device; re-assigning the mobile device from the first beam to the second beam; and forwarding, to the mobile device, via the second distribution device, data determined to have been lost due to the first beam failing to satisfy the defined condition.

In some embodiments, the mobile device can report a new, alternative beam during a 4-step random access channel (RACH) procedure in message 3. This new beam can subsequently be used in message 4 of the RACH procedure, in addition to subsequent beam management procedure for connected mode mobile devices.

One or more embodiments can enable faster recovery of lost connectivity in situations in which the network may not have reliable radio link measurements from all available beams visible to the mobile device. As used herein, the term "beam" and "beam pair link" can be used interchangeably. This may be the case, for example, in mmWave frequency based 5G network deployments in dense busy urban areas, where dynamically changing environments may cause sudden and frequent signal blockages. In such environments, the mobile device may be in the better position to determine which beam pair links it can detect best. The proposed method allows the mobile device to assist the network by exploiting this information, thereby improving how quickly a mobile device recovers from a lost connection. In some embodiments, the proposed solution allows indicating radio link interruption to the network on a per-service basis to allow faster recovery for that service.

FIG. 1 illustrates an example, non-limiting message sequence flow chart to facilitate mobile device-assisted mobility enhancement to improve user plane interruption time in a wireless communication system in accordance with one or more embodiments described herein. As used herein, the term "user plane" can include, but is not limited, a channel that carries data (as opposed to carrying control information) to be delivered to the mobile device (or application executing on the mobile device). For example, in embodiments in which the mobile device 104 is downloading a file, the data for the file are carried over the user plane while the control plane carries the signaling that supports the transmission of the data.

As shown, in FIG. 1, the system 100 comprises network 102, base station device 103 (BS device 103), one or more distributed units (DUs) (e.g., DU1 106, DU2 108) associated with the BS device 103, and one or more transmission points (TRPs) (e.g., TRP1 110, TRP2 112, TRP3 114 and/or TRP4 116). As shown, TRP1 110 corresponds to beam 118, TRP2

112 corresponds to beam 120, TRP3 114 corresponds to beam 122 and/or TRP4 116 corresponds to beam 124. In one or more embodiments, one or more of network 102, base station device 103 (BS device 103), one or more DUs (e.g., DU1 106, DU2 108) associated with the BS device 103 and/or TRP1 110, TRP2 112, TRP3 114 and/or TRP4 116 can be electrically and/or communicatively coupled to one another to perform one or more functions of the system 100. FIG. 1 shows mobile device 104 connected to DU1 106 at time 1 and mobile device 104 connected to DU2 108 at time 2.

System 100 can be a 5G network (also interchangeably referred to as a "NW" network). The network can be designed with multiple TRPs (e.g., TRP1 110, TRP2 112, TRP3 114 and/or TRP4 116) belonging to a DU. For example, in FIG. 1, TRP1 110 and TRP2 112 are associated with DU1 106 while TRP3 114 and TRP4 116 are associated with DU2 108). Multiple DUs can belong to one BS device 103, as shown in FIG. 1. Additionally, 5G networks can be designed to offer beam-based mobility, such that when mobile device 104 moves across the network 102, the mobile device 104 can switch from one beam to another beam. When the new beam to which the mobile device 104 has switched and/or selected, belongs to a TRP being served by the same DU that the previous mobile device 104 beam was served by, mobility between the old and new beams can be seamlessly accomplished at the physical layer using mobility without RRC involvement (and therefore no new RACH procedure need be performed). Such mobility does not require a RRC-based handover or multi-connectivity/ dual connectivity (or a procedure for dual/multi connectivity).

Figure 2:
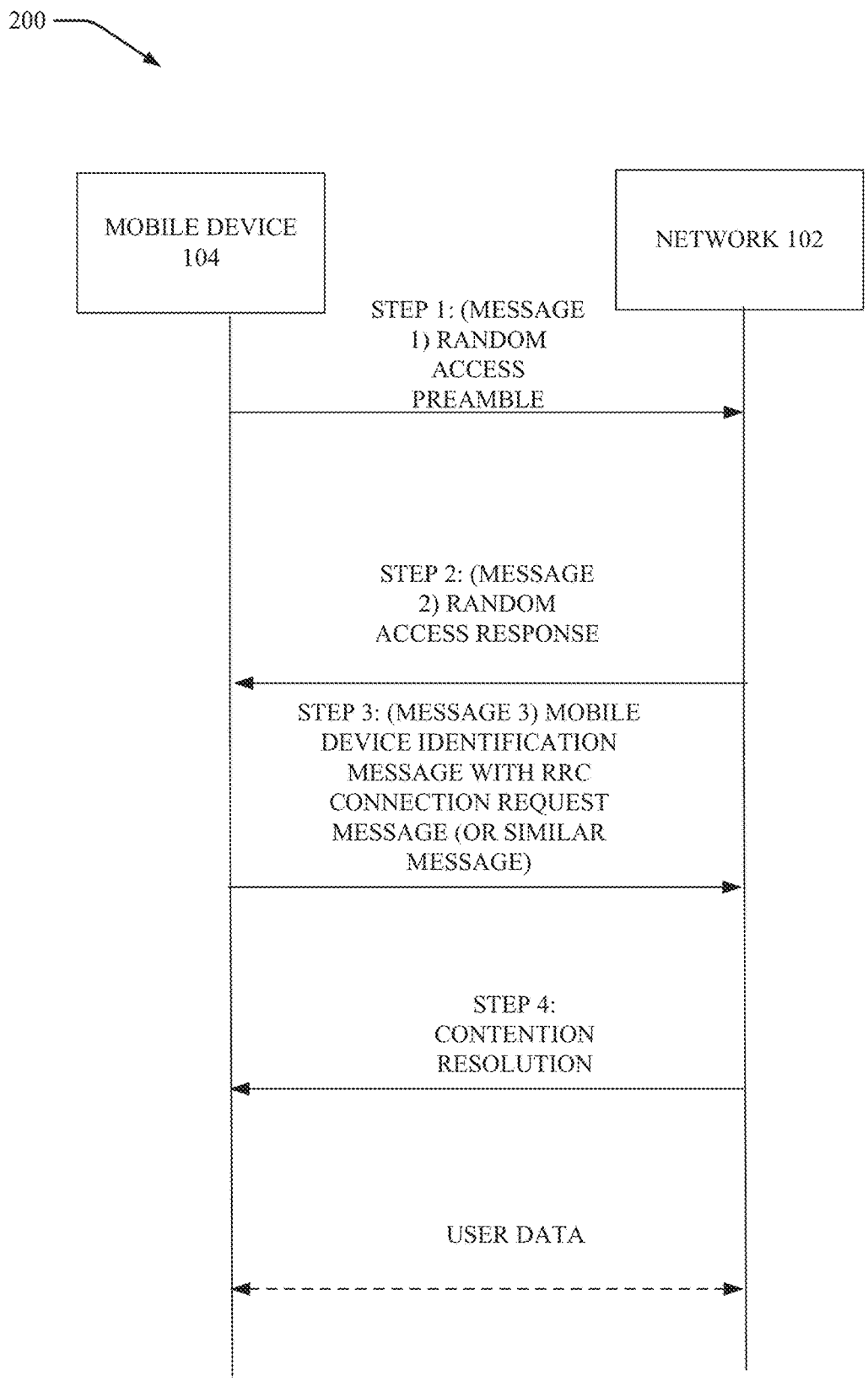
FIG. 2 illustrates an example, non-limiting message sequence flow chart to facilitate mobile device-assisted mobility enhancement to improve user plane interruption time in a wireless communication system in accordance with one or more embodiments described herein.
Figure 5:
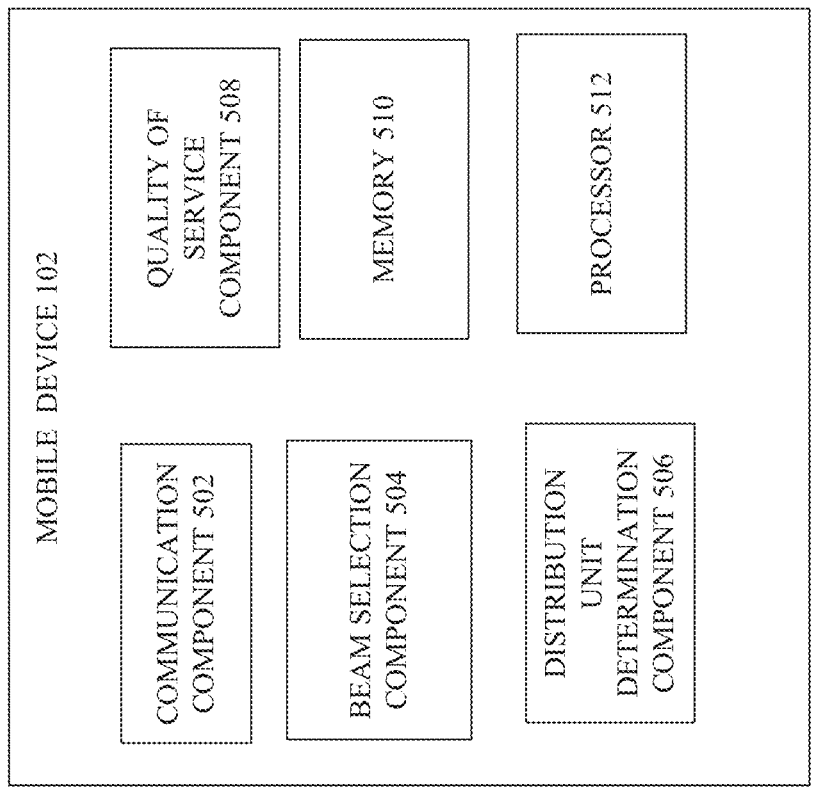
FIG. 5 illustrates an example, non-limiting block diagram of a mobile device that can employ mobile device-assisted mobility enhancement to improve user plane interruption time in accordance with one or more embodiments described herein.
Figure 6:
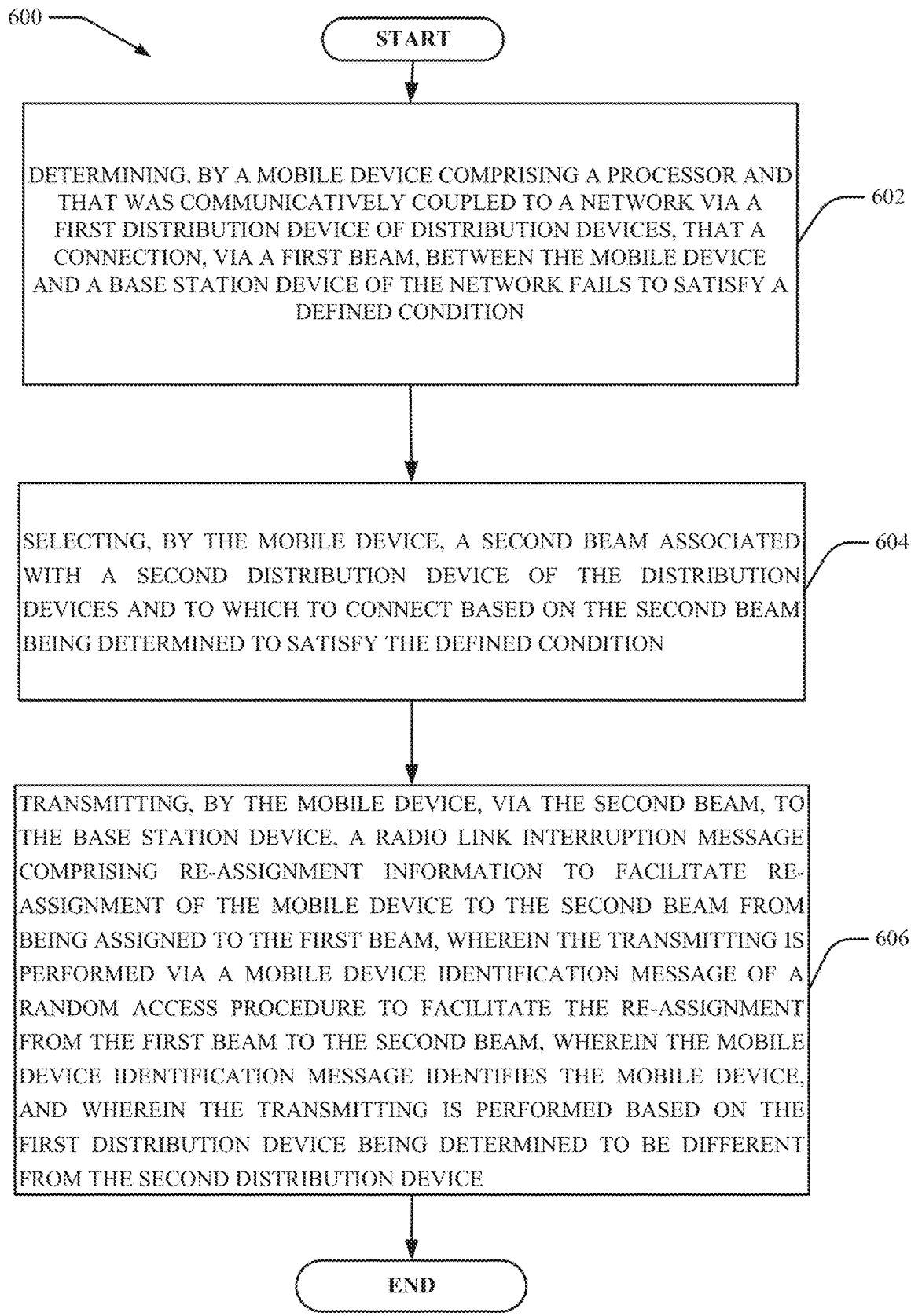
FIGS. 6, 7, 8 and 9 illustrate flowcharts of methods facilitating mobile device-assisted mobility enhancement to improve user plane interruption time in a wireless communication system in accordance with one or more embodiments described herein.

For example, if the mobile device 104 is communicating employing TRP1 110 (e.g., beam 118) and switches to TRP2 112 (e.g., beam 120), the same DU1 106 is employed and therefore downlink data can be routed to the mobile device 104 via the new beam 120 with no RACH procedure. However, if the mobile device 104 moves from the TRP2 112 (e.g., beam 120) to TRP3 114 (e.g., beam 124) then a new DU (e.g., DU2 108) is now employed and a new RACH procedure such as that discussed with reference to FIGS. 2 and 5 are employed in one or more embodiments described herein.

As used herein, the term "dual connectivity connection," "dual connectivity" and/or "multi-connectivity" can mean a mobile device 104 can have sessions to the network 102 through two different cells concurrently. For example, with reference to FIG. 1, if the mobile device 104 already had a dual connectivity connection established for the mobile device 104 at DU2 108 (in addition to already having a connection with DU1 106) then if the mobile device 104 tried to download a file at the PDCP component 105, the bits that make up the file would be separated into two streams and one stream can be received through DU1 106 and the other stream can be received through DU2 108. As such, the mobile device 104, for example, could receive the two streams over TRP2 112 and TRP3 114 concurrently and such would be an example of dual connectivity.

In some embodiments, the BS device 103 can be a mmWave BS device. As used herein, the term mmWave BS device can be or include a BS device that is typically 30 gigahertz (GHz) to 300 GHz, where wavelengths are 10 millimeters (mm) to 1 mm. Although in other embodiments, the BS device 103 can be any number of other types of BSs or access point devices. As shown, different TRPs can be communicatively coupled to different DUs.

One or more embodiments herein enables the mobile device 104 to initiate signaling to indicate to the network 102 and/or the BS device 103 that a beam is lost or of poor quality as opposed to such indication being initiated by the network 102 and/or the BS device 103. If the mobile device 104 was/is connected to the TRP1 110 through a beam (e.g., beam 118) and the mobile device 104 moves physically or there is a signal blockage (the mobile device 104 may move for example if the beam is lost or low quality or low signal strength, Reference Signal Received Power (RSRP), Reference Signal Received Quality (RSRQ) and/or signal-to-interference noise ratio (SINR)), the mobile device 104 can detect and/or measure the change in signal level and then connect to TRP2 112 through a different beam (e.g., either beam 120 or beam 122). In various embodiments, signal blockage could be caused by an object (e.g., bus) moving to a location that blocks the beam between the TRP and the mobile device 104. The new, desired beam can have a stronger signal, for example, as measured by the mobile device 104, than the signal from the previous beam that is lost or undesirable. If the mobile device 104 connects to beam 120, there is still the same DU (e.g., DU1 106 as that which was used when the mobile device 104 was connected to beam 118). As such, there is no handover.

However, if the mobile device 104 moves to TRP3 114 from TRP 1 110 (or from TRP2 112) then the mobile device 104 has moved from DU1 106 to DU2 108. As such, a handover to a new DU and/or a dual connectivity procedure can be performed in one or more embodiments herein.

To allow the mobile device 104 to connect through TRP3, usually such requires layer 3 signaling but such is slow. One or more embodiments described herein provides systems and methods to improve the speed of mobile device 104 mobility (e.g. how quickly the network 102 and/or BS device 103 responds to the mobile device 104 mobility). The trigger that initiates beam switching can be beam blockage as described above and/or physical movement of the mobile device 104. In some embodiments, the mobile device 104 can find a new usable beam based on radio link measurements. If during such a beam recovery procedure, the usable beam is found to belong to another cell, this can also constitute a mobility event resulting in a handover or dual/ multi connectivity based procedure. One or more embodiments provide ability for the network 102 and/or the BS device 103 to respond quickly to such situations.

In embodiments in which a mobile device (e.g., mobile device 104) is switching from a beam associated with one DU to a beam associated with another DU, if the source and target DUs belong to different cells (e.g., are coupled to different cell devices), in one or more embodiments, a RRC-based handover procedure or a dual/multi-connectivity-based procedure can be provided (and layer 3 signaling is typically employed). If the source and target DUs belong to the same cell (e.g., are coupled to the same cell device), mobility can be facilitated by a layer 2 based procedure, such as dual//multi connectivity procedures with limited RRC signaling.

One or more embodiments described herein can provide mobility enhancements in which the network 102 and/or the BS device 103 is not taking the action to initiate a change in beam; rather, the mobile device 104 is actively indicating to the network 102 (and/or the BS device 103) via transmissions using the new beam selected by the mobile device 104 that the mobile device 104 has experienced a failure. The mobile device 104 tries to access the network 102 and/or the BS device 103 through another beam (which could be associated with a different DU from the DU with which the beam that failed was associated). The mobile device 104 can send the message to the network 102 and/or the BS device 103 about the failure through the new beam and requesting that the network 102 and/or the BS device 103 add another leg so that the communication lost earlier (e.g., lost due to the previous beam failure) can be resumed and the packets held up or not acknowledged (that were sent to the beam that was lost) can be forwarded or re-delivered to the mobile device 104. Accordingly, in these embodiments, the mobile device 104 can proactively indicate that the mobile device 104 was in a session and lost such session.

Such network-based procedures rely on the availability of reliable layer-3 based radio link measurements reported by the mobile device 104 to the BS device 103. Unless the BS device 103 has measurement reports available from the mobile device 104, the BS device 103 can be unable to make proper decisions for preparing a target cell for handover or adding a secondary node. Moreover, since signal blockage can be quite dynamic, the mobile device 104 may be in the best position to determine which beam the mobile device 104 can detect best. This is a motivation for developing mobile device-assisted approaches such as those described herein.

The proposed methods can provide a new mobile device-assisted method of triggering a dual/multi connectivity secondary node addition process based on a message sent by the mobile device to the network 102 and/or the BS device 103 to help the network 102 and/or the BS device 103 determine the best target DU for secondary node addition. The proposed procedure is also described in FIG. 5.

The mobile device 104, based on measurements, tends to know which beams are near the mobile device 104. The mobile device 104 can then determine if the beam belongs to the same DU or to a different DU. In some embodiments, the methods for the mobile device 104 determining whether the DU belongs to the same or different DU can be as discussed below. In some cases, the network 102 and/or the BS device 103 can make such determination.

If the mobile device 104 and/or the network 102 or BS device 103 determines that the new beam belongs to a different DU than the DU of the previous beam the mobile device 104 was using that filed, then when the mobile device 104 is performing the RACH access process (as described in FIG. 2) the mobile device 104 can send an RRC connection message (e.g., message 3 in the RACH procedure) such that the message 3 is enhanced with the mobile device 104 identity or any other information the mobile device 104 desires to indicate to the network 102 and/or the BS device 103. The mobile device 104 can indicate that the mobile device 104 was in an earlier session and that information can be sent. This sending the information in the RRC message can help the network 102 and/or the BS device 103 data mine and avoid the network 102 and/or the BS device 103 having to start the process of re-establishment of a connection with the mobile device from scratch (and re-send all packets from the previous session) because the network 102 and/or the BS device 103 can retrieve the mobile device 104 identity and estimate which packets were likely lost when the session was lost. If there is not a dual connectivity connection already established then the network 102 and/or the BS device 103 can establish such via the new DU. The packets from the old DU can then be forwarded to the new DU and there can be overall less interruption time on the user plane than if the network 102 and/or BS device 103 identified the loss of beam (instead of the mobile device 104 doing so).

FIG. 2 illustrates an example, non-limiting message sequence flow chart to facilitate mobile device-assisted mobility enhancement to improve user plane interruption time in a wireless communication system in accordance with one or more embodiments described herein. Repetitive description of like elements employed in other embodiments described herein is omitted for sake of brevity. While FIG. 2 is described with reference to a network (e.g., network 102) it is understood that the network can be interchangeable with DU1 106 and/or DU2 108 in one or more embodiments.

In some embodiments, the system 200 can facilitate indication of a beam (or, in some embodiments, multiple beams) in random RACH resources for beam management. For example, the beam indicated can be the beam that the mobile device 104 requests receipt of data over in lieu of the previous beam that meets a defined condition (the mobile device 104 has lost the beam, the strength of the beam is low or weak, etc.). One or more embodiments of the system 200 described herein can provide signaling and/or transmission protocols to facilitate enhanced beam management procedure by indicating one or more DL transmission beams from the network 102 (and/or DU1 106 or DU2 108) to the mobile device 104 during the RACH procedure. In some embodiments, the beam management can be a mobile device 104 assisted beam indication at the mobile device during the RACH procedure as described herein.

While the system 200 shows a single network 102 and a single mobile device 104, in various embodiments, multiple BS devices and/or multiple mobile devices can be included in system 200. All such embodiments are envisaged.

With reference to FIG. 2, one or more of reference signals and/or pilot signals can be transmitted within the system 200. The reference signals and/or the pilot signals can be beamformed or non-beamformed. In some embodiments, the wireless communication system can be a 5G system, although such is not required. As used herein, the term "random access" can mean the procedure for the mobile device 104 to request a connection setup from the network 102. Random access can be employed for initial access to the network 102 by the mobile device 104 in some embodiments. For example, random access can be employed to facilitate the mobile device 104 moving from radio resource control (RRC)_idle state to RRC_connected state. In some embodiments, the random access can be employed to re-establish a connection between the mobile device 104 and one or more beams (e.g., network 102 beams) after failure of a beam (e.g., beams 118, 120, 122 and/or 124) to facilitate a communication channel between the mobile device 104 and a DU).

Beam management is a procedure used to acquire and maintain a set of transmitter/receiver point (TRP) beams (e.g., TRPs 110, 112, 114, 116) that can be used for DL transmission, which can include, but is not limited to, beam determination, measurement, and/or reporting. For idle mode mobile devices in initial/random access, beam measurement and/or reporting can be performed using Synchronization Signal (SS) blocks. DL measurements by the mobile device 104 can be supported on both single beam and multi-beam based operations. SS-block-RSRP can be used to measure the beam quality per signal synchronization (SS) block.

In the embodiments described herein, the beam (beam 118, 120, 122 and/or 124) can correspond to a TRP of TRPs TRP1 110, TRP2 112, TRP3 114, TRP4 116 and can be selected by the mobile device 104 and communicated to the network 102 in one or more embodiments described herein in message 3 (step 3 of FIG. 2). The mobile device 104 can perform beam measurement of one or more new or existing beams and report a new desired beam to the network 102 in the random access procedure in message 3. This new beam can subsequently be used in message 4 of the RACH procedure, in addition to subsequent beam management procedure in the mobile device 104 connected mode to facilitate the mobile device 104 receiving data over the new beam.

The random access procedure of FIG. 2 can be initiated after the mobile device 104 measures and/or detects a problem or weakness in an existing beam on which the mobile device 104 is receiving data. When the mobile device 104 tries to connect to the network 102 and/or any network device (e.g., DU1 106 and/or DU2 108) in general, there are uplink (UL) beams that are used for reception from the mobile device 104 to the network 102 and there are DL beams that are used for transmission to the mobile device from the network 102 based on the mobile device 104 and the network 102 performing a synchronization procedure. Accordingly, the mobile device 104 can detect a number of DL beams and can select from any number of different DL beams for one or more beams on which to receive DL transmission. The beams can be determined to correspond to an existing DU over which the mobile device 104 is receiving data or a new DU.

Referring to FIG. 2, as shown, in step 1, the mobile device 104 can transmit a first message to the network 102. The first message can include a random access preamble for the network 102 and/or network to estimate the mobile device 104 timing and/or establish uplink synchronization. In the message 2, the network 102 and/or network can then transmit a random access response. The random access response can include, but is not limited to, a timing advance command to adjust the mobile device 104 transmit timing. In some embodiments, the network 102 and/or network can assign uplink resources for the mobile device 104 to use for the device identification message shown in step 3.

In some embodiments, the beam selected by the mobile device 104 can be a DL beam that has the best signal strength or power received at the mobile device 104 and/or that has a signal strength or power received at the mobile device 104 that at least exceeds or is substantially equal to a defined threshold. This selection of the beam can be indicated in message 3 of the system 200 via the RRC message or another message including information the same as or similar to that provided in whole or in part in the RRC message.

For example, in message 3, the mobile device 104 can employ the uplink physical uplink shared channel (PUSCH) to transmit the identity of the mobile device 104, among other information, to the network 102 and/or to the network. For example, the identity can be transmitted in a device identity message and/or any resource of the message 3. Further, the mobile device 104 can measure and/or report another beam (e.g., a new desired beam) in message 3 of the RACH procedure and the network 102 and/or network can switch between the first beam that the mobile device was initially using and detected to have failed a condition or have a weakness to a second, new beam. In particular, in some embodiments, the mobile device 104 measures the received power of the beams (existing and potential new beams) whenever synchronization signal (SS) blocks (which include the beams) are received by the mobile device 104. The SS blocks are sent periodically by the network 102 to the mobile device 104 and are not sent on demand.

It is to be noted that the selection of the beams by the mobile device 104 is not necessarily done in the RACH procedure. Rather, the reporting from the mobile device 104 to the base station device 103 can be performed during the RACH procedure. In some embodiments, the reporting of the new, desired beam information by the mobile device 104 can be performed in step 3 of the RACH procedure and is done explicitly in the sense that information about this beam is sent in the payload of the message 3 in step 3 of FIG. 2.

Accordingly, in one or more embodiments, the selection by the mobile device 104 can be beam-based as opposed to cell-based. In beam-based approaches there can be greater directionality and corresponding benefits of the same since there can be multiple smaller beams than for the case of the 3-sector cell-based approach, and the mobile device 104 can select a smaller beam within a particular cell sector, for example as there can be multiple beams being transmitted from a single cell sector of a network (e.g., network 102).

In some embodiments, in message 4, the network 102 can transmit a contention resolution message on the DL physical downlink shared channel (PDSCH) if there is a contention due to multiple mobile devices trying to access the network 102 and/or network. As used herein, contention resolution message is a message that can specify which of multiple mobile devices can access a channel at any particular time. For example, in cases in which more than one mobile device is attempting to access the channel, the contention resolution message can specify which mobile device should access the channel first and/or generally transmit information indicating selection of one mobile device for initial access of the channel. After contention resolution, as shown, the user data associated with the mobile device 104 can be transmitted and/or received.

Accordingly, in some embodiments, all four messages can be transmitted on the new DL beam that the mobile device 104 selected. The mobile device 104 can transmit information identifying the new beam in the message 3 device identification message.

Figure 3:
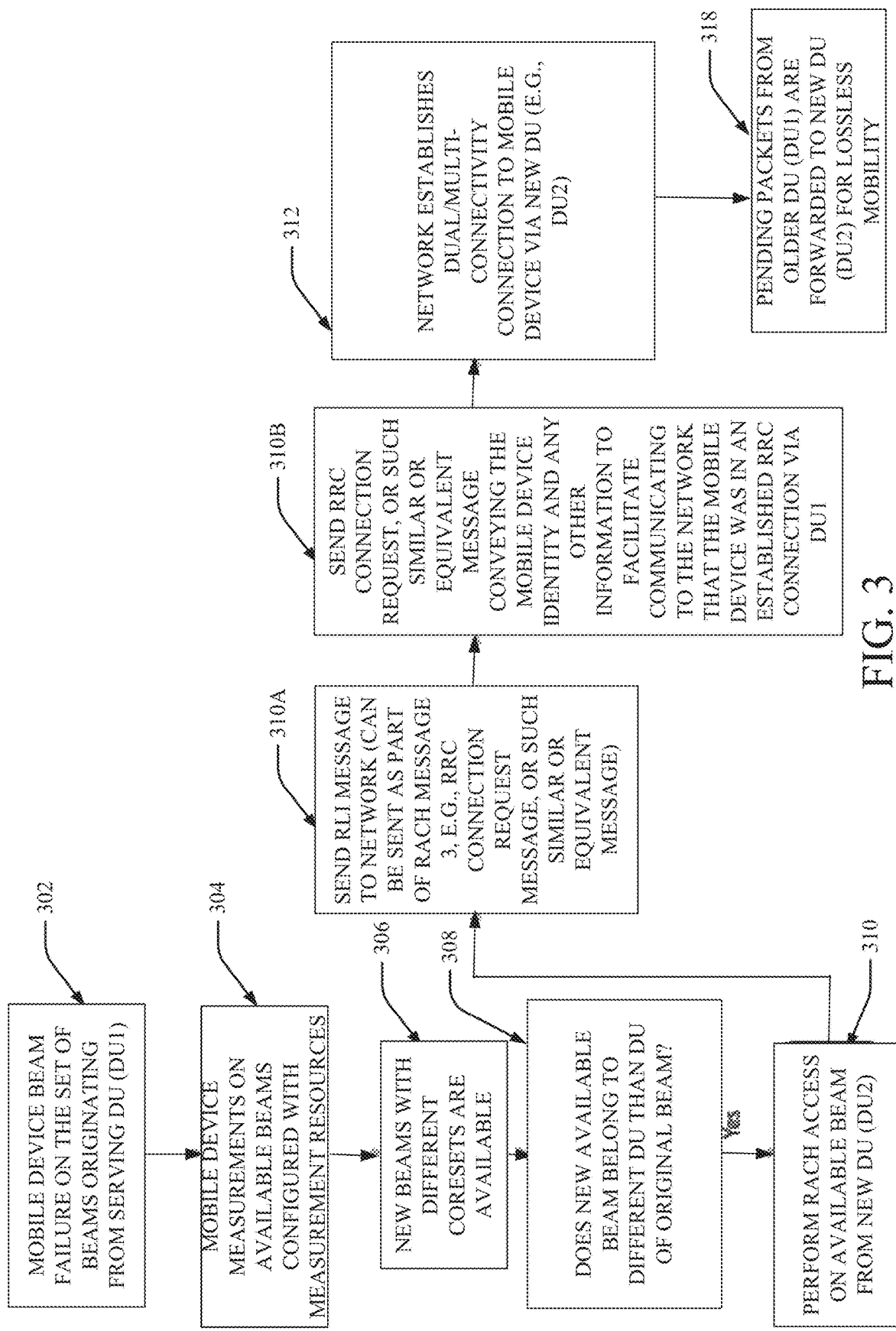
FIG. 3 illustrates an example, non-limiting flow diagram of a mobile device-assisted mobility procedure to improve user plane interruption time in accordance with one or more embodiments described herein.

Turning now to FIG. 3, illustrated is an example, non-limiting flow diagram of a mobile device-assisted mobility procedure to improve user plane interruption time in accordance with one or more embodiments described herein. With reference to FIGS. 1, 2 and 3, at 302, the mobile device (e.g., mobile device 104) detects failure on one or more of the set of beams originating from serving DU (e.g., DU1 106) (or, in some embodiments, the mobile device 104 determines that the beam on which data is being received by the mobile device meets a defined criterion (e.g., has a strength that is less than a defined threshold or indicative of being a weak signal).

At 304, the mobile device (e.g., mobile device 104) can perform one or more measurements on one or more available beams configured with measurement resources. At 306, the mobile device can determine that new beams are available (the new beams can have different CORESETs in some embodiments).

At 308, the network (e.g., core network 202 and/or DU1 106 and/or DU2 108) can determine whether the available beam identified by the mobile device belongs to a different DU (in this case, whether the available beam identified by the mobile device belongs to a DU different from DU1 106).

At 310, if the available beam belongs to a different DU than DU1 106, the mobile device can perform and/or participate in a RACH procedure to acquire the new beam from the new DU (e.g., in this case, DU2 108). In some embodiments, the RACH procedure can be the procedure indicated and/or described with reference to FIG. 1 and between the mobile device and the new DU (e.g., DU2 108). If the new available beam does not belong to a different DU, there is no RACH procedure performed and the existing DU begins to send data (e.g., on the user plane) to the mobile device via the new available beam.

The RACH procedure can be modified to include the steps shown in 310A and 310B. For example, at 310A, the mobile device can transmit a message (e.g., in some embodiments, a radio link interruption (RLI) message) to the network (e.g., the core network 202 and/or the new DU 2, in this case DU2 108). In some embodiments, the message can be sent as part of the step 3 message of the RACH procedure (e.g., the radio resource control (RRC) connection request message, or another message that includes the same or similar information). At 310B, the RRC connection request, or equivalent or similar message can convey the mobile device identity and/or other information to communicate to the network (e.g., core network 202 and/or the new DU 2) that the mobile device was in an established RRC connection via the previous DU (in this case, DU1 106).

At 312, upon receiving the message, network can determine, establish and/or transmit information indicative of establishment of a dual/multi-connectivity connection to the mobile device via the new DU (e.g., in this case, DU2 108). At 314, pending packets and/or packets sent to the mobile device that were lost (and/or for which no acknowledgement message was received) are forwarded (or re-forwarded) to the new DU from the network to facilitate lossless mobility (or to reduce packet loss generally relative to the scenario in which the network informs the mobile device of beam loss as opposed to the mobile device informing the network of such).

In some embodiments, in lieu only sending the mobile device 104 identity/identity and information indicative of the selected beam, the mobile device 104 can also send to the network 102 and/or the BS device 103 in the RRC a security key. The security key can be the security key that the mobile device 104 employs for data received by the mobile device 104. If there is handover from one DU to another DU, the security key can be re-established. Typically, when the connection is lost, the process to setup a security key must start over (e.g., upon the new RRC connection being established the network 102 and/or the BS device 103 would typically establish a new security key). In this embodiment, in lieu of wasting the time to re-establish a new security key, the mobile device 104 can send the security key and/or information related to the security key (to enable the network 102 and/or the BS device 103 to determine the security) along with the mobile device 104 identity/identity.

One or more embodiments can enable the determination of the identity associated with the DU for the new beam selected by the mobile device 104. In some embodiments, to decide whether to send an RLI indication to the network 102 (and/or the BS device 103), the mobile device 104 can determine whether the available beam belongs to a different DU compared to its original serving DU. The mobile device 104 can do so in different embodiments explicitly or implicitly as follows.

In an embodiment, an explicit indication can be provided. For example, in cases in which the network 102 (and/or the BS device 103) is configured with one-to-one correspondence between cell identity and DU, the mobile device 104 can determine the cell identity by decoding the SS block information corresponding to the measured beam to determine whether the beam belongs to the same DU or a new DU. The mobile device 104 can detect that the new beam belongs to a new DU (when such is the case) and can send an RLI message to the network 102 (and/or BS device 103) as shown in FIG. 1.

Accordingly, ion cases in which the network 102 (and/or the BS device 103) is configured with more than one DU per cell, an explicit DU identity can be signaled to the mobile device 104 and can indicate to the mobile device 104 whether the measured beam belongs to a new DU. The mobile device 104 can detect that the new beam belongs to a new DU (when such is the case) and can send an RLI message to the network 102 (and/or BS device 103) as shown in FIG. 1.

In some embodiments, an implicit indication of whether the DU is a new DU can be determined by a DU (e.g., in various embodiments, DU1 106 and/or DU2 108). The DU can determine whether the TRP for the selected new beam is the same or different relative to the previous TRP for the previous beam (which was lost by the mobile device 104). In this embodiment, for example, the mobile device 104 can implicitly inform the network 102 (and/or BS device 103) whether the available beam belongs to another DU as follows.

The mobile device 104 can send an RLI indication message to the network 102 (and/or BS device 103) under the following conditions. Whenever the mobile device 104 detects that the available beam has a reference SS block with a different (QCL) configuration compared to that of the beams from the original DU, the mobile device 104 can send an RLI indication to the network 102 (and/or BS device 103). However, simply providing this indication may not mean that the available beam belongs to a new DU. It may simply mean that the new beam is available from a non-QCLed antenna panel, which may be supported by to the original DU or a new DU.

In NR networks, the mobile device 104 can receive SS blocks (which are for obtaining initial access information). If a beam is being sent there can be another beam that is quasi-colocated (located along with the other beam) then the SS blocks for those two beams will typically have the same so the mobile device 104 can determine that the two SS blocks read by the mobile device 104 are quasi-colocated. In another embodiment, however, if the mobile device 104 detects a beam from a different TRP then the QCL configuration would be different (the mobile device 104 would be able to tell that this SS block is coming from an antenna that is not quasi-colocated with the other antenna from which the mobile device 104 was reading previously). For example, with FIG. 1, when the mobile device 104 reads a beam from TRP2 112 and compares with a configuration of an SS block from TRP3 114, the mobile device 104 can determine that the second beam is from a location that has a physically different TRP location. In one or more embodiments, the mobile device 104 would know the beam is from a different TRP so for the implicit indication, whenever the mobile device 104 detects the new beam has a different QCL configuration, by default, the mobile device can send the RLI indication to the network 102 (and/or BS device 103). The network 102 (and/or the BS device 103) can then determine whether the new beam selected by the mobile device 104 belongs to a new DU. If the beam belongs to a new DU, then the RACH procedure can be performed. In some embodiments, if the beam does not belong to a new DU, no RACH procedure is performed.

In another example, an implicit indication can be provided in which the mobile device 104 sends an RLI indication message if a triggering condition is met. One triggering condition can be the mobile device 104 detecting that the available beam has signal quality (e.g., signal strength, RSRP, RSRQ and/or SINR) above a configured threshold and/or a measured angle of arrival (AoA) outside of a configured range by the network 102 and/or BS device 103. Another triggering condition can be if a new available beam has very different signal quality or a different AoA than the beam that was lost at the mobile device 104 (and, as such, likely does not belong to same TRP since the beam is being received at the mobile device 104 from a different angle).

In these cases, in one or more embodiments described herein, the mobile device 104 may not need to explicitly know whether the new beam belongs to the original DU or a new DU. Since the network 102 and/or BS device 103 knows exactly which DU was serving the mobile device 104 when the network 102 and/or the BS device 103 receive the RLI message from the mobile device 104 via the new beam, the network 102 and/or the BS device 103 can typically determine whether the RLI was received from a new DU or the original serving DU.

One or more embodiments can provide for sending the RLI message and/or establishment of dual connectivity/multi-connectivity leg establishment. Upon determining whether to send an RLI message, the mobile device 104 can send the RLI message to the network 102 and/or the BS device 103 as follows. As described in FIG. 2 herein, the mobile device can perform a RACH procedure on the available beam using contention-based physical random access channel (PRACH) transmission (the mobile device 104 finds the appropriate time where the mobile device sends an uplink RACH transmission and there could be other mobile devices doing the same so a collision could happen). Another approach could be contention-free PRACH transmission using RACH preambles (e.g., the network 102 and/or the BS device 103 sends information to the mobile device 104 to indicate whether a transmission from the mobile device 104 was successful and then sends an uplink grant and then mobile device 104 then sends the RLI at the time indicated in the uplink grant). The RACH preambles can then be preserved for the mobile devices and these are contention free.

In case of contention-free PRACH transmissions are used to send a RLI indication, the mobile device 104 may receive the corresponding PRACH configuration (e.g. time/frequency resources and preambles) via dedicated signaling such as RRC setup or a handover (HO) setup message. In another example, the mobile device 104 can obtain the PRACH configuration from the system information broadcast by the serving or target DU.

In some embodiments, in addition the RACH procedure for sending a RLI indication may not be the full four step procedure as shown in FIG. 2 and instead can be a simplified two step procedure using dedicated resources and known mobile device 104 identity.

The principle underlying the two-step RACH procedure is that a message 1 of the two-step RACH procedure (which corresponds to message 3 in the four-step RACH procedure) is transmitted at first. The network 102 and/or BS device 103 can respond with a message 2 (corresponding to message 2 and message 4 of the four-step RACH procedure) for contention resolution upon successful reception of message 1 of the two-step RACH procedure. Due to the reduced message exchange (relative to the four-step RACH procedure), the latency of the two-step procedure is expected to be reduced compared to the four-step RACH procedure assuming the same success rate for both procedures. The radio resources for the messages can be optionally configured by the network, which can configure or restrict the usage of the procedure to certain cases (e.g., only in certain procedures, services, radio conditions etc.). The procedure is not restricted to be used with a certain mobile device identity message size.

Turning back to FIG. 1, in some embodiments, upon receiving the resource grant from the network 102 and/or the BS device 103, the mobile device 104 can transmit any of the following: a modified RRC Connection Request message to the network 102 and/or the BS device 103. In this embodiment, the modified RRC Connection Request message may include additional Information Elements (IEs) that provide RLI indication and any relevant mobile device 104 Id related information and security credentials that may be necessary for the network to determine that this transmission is from the mobile device 104 that was already in an active data session via the original DU.

A new RRC message designed specifically to indicate RLI to the network 102 and/or the BS device 103 that includes IEs that provides any relevant mobile device 104 identity/identity related information and security credentials that may be necessary for the network to determine that this transmission is from the mobile device 104 that was already in an active data session via the original DU.

Upon receiving the RRC message with RLI indication (modified RRC Connection Request or otherwise), the network 102 and/or the BS device 103 does not proceed further with normal RRC connection establishment procedure, but may verify the mobile device 104 identity and trigger a secondary node addition procedure to establish a secondary connection (dual connectivity or multi-connectivity) to the mobile device 104 via the new DU. After establishment of secondary leg, the network may perform fast retransmissions of pending PDCP PDUs to the mobile device 104 via the new DU associated with the new beam.

In some embodiments, services with different quality of service (Qos) requirements can be accommodated. In the initial embodiments described above, the mobile device 104 sends an RLI message to the network 102 and/or the BS device 103 and that results in the communication with the mobile device 104 being resumed (albeit through the new beam). In this embodiment, an enhancement is provided for QoS provisioning. In this embodiment, the mobile device 104 can be configured to provide data (or non-data) services with different QoS requirements. In embodiments in which one service is configured to be received by the mobile device 104 via one TRP and another service is configured to be received by the mobile device 104 through a different TRP (e.g., there may be different TRPs used, for example, for reasons such as the mobile device 104 has a very low latency service that it is providing and the other service is a high bandwidth latency insensitive service, thus the different services typically utilize TRPs with different characteristics). As such, the latency sensitive service can be provided through one TRP (e.g., a TRP that may have a backhaul connection that results in low latency while the other service can be provided via another TRP). This embodiment may not be dual connectivity because dual connectivity calls for splitting data from a single bearer (while the embodiment described that has different services is a multiple bearer situation).

In this embodiment of multiple services with different QoS requirements, if the mobile device 104 loses the connection at one group (one set of TRPs), for example if the first service is configured to one TRP and the mobile device 104 loses connectivity for that service then the RLI can also indicate what the service identity is for the service that was lost so that the network 102 and/or BS device 103 will know such information. If there is another TRP that meets the QoS for the specific service that was lost, the network 102 and/or BS device 103 can identify such TRP and/or a beam for the mobile device 104 to use for receipt of the service. As before, in some embodiments, a security key can be provided and/or data lost from the service can be forwarded/re-forwarded to the mobile device via the new TRP and/or new beam.

In some embodiments, a mobile device 104 can be configured with various data services with different QoS requirements. In a multi-tier network architecture supporting services with diverse service requirements, it is possible that one service to the mobile device 104 may be supported via one set of TRPs (or control resource sets or CORESETs), while another service to the mobile device 104 may be supported via another set of TRPs. This could be possible, for example, due to the transport network infrastructure supporting one set of TRPs versus another set of TRPs. More specifically in an example, it is possible that a set of TRPs (CORESET Group 1) are supported by very fast low latency transport architecture with limited bandwidth capacity, while another set of TRPs (CORESET Group 2) can be supported by transport architecture with slightly higher latency, but very high bandwidth. In such a case, low latency services, such as Ultra Reliability Low Latency Communications (URLLC), may be configured via set 1, while high bandwidth broadband services (eMBB) may be configured via set 2.

In such a scenario, when the mobile device 104 experiences radio link interruption on CORESET Group 1, similar to the procedure described in previous section, it could send an RLI message, with service identity, to the network to indicate interruption for that service. Additionally, since the mobile device 104 may already be configured for service via another CORESET group, it may send the RLI message via a PUCCH channel corresponding to the other CORESET group instead of performing full RACH access.

In another example the resources for sending the RLI message may be reserved per CORESET group or service identity and may correspond to PUCCH resources, and contention or contention-free based RACH resources (time/frequency/preambles) for a four-step or two-step RACH procedure. In addition, which procedure is used by the mobile device 104 may be configured per CORSET group or service type.

Figure 4:
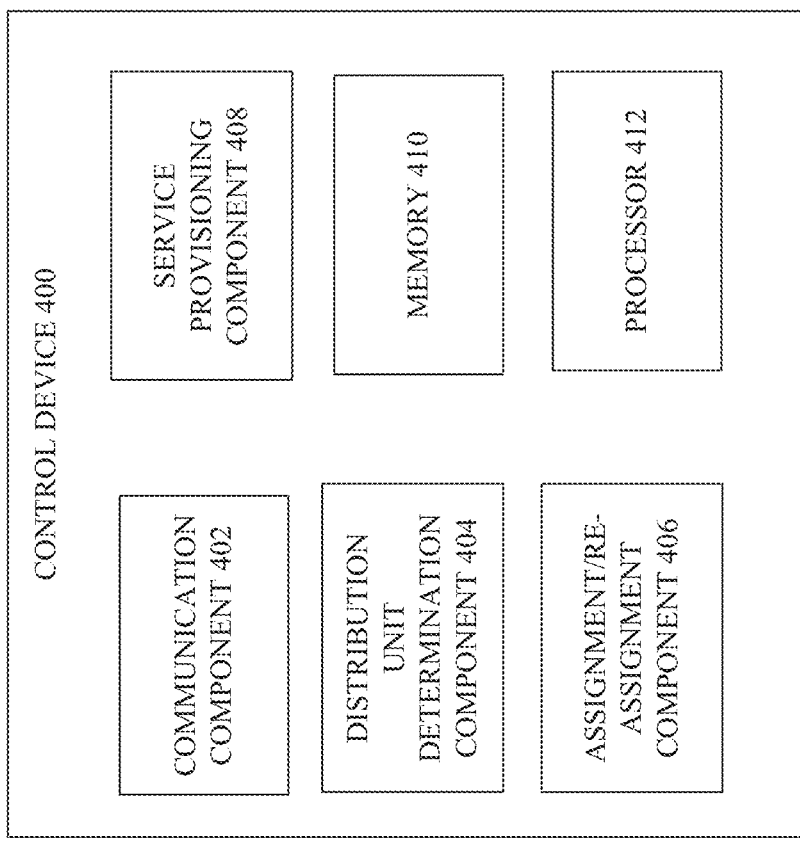
FIG. 4 illustrates an example, non-limiting block diagram of a control device facilitating mobile device-assisted mobility enhancement to improve user plane interruption time in accordance with one or more embodiments described herein.

FIG. 4 illustrates an example, non-limiting block diagram of a control device facilitating mobile device-assisted mobility enhancement to improve user plane interruption time in accordance with one or more embodiments described herein. FIG. 4 illustrates an example, non-limiting block diagram of a mobile device that can employ mobile device-assisted mobility enhancement to improve user plane interruption time in accordance with one or more embodiments described herein.

The control device 400 of FIG. 4 can be or include or be included within the BS device 103 and/or the network 102 in various different embodiments. As shown, the control device 400 can comprise communication component 402, DU determination component 404, assignment/re-assignment component 406, service provisioning component 408, memory 410 and/or processor 412. In various embodiments, one or more of the communication component 402, DU determination component 404, assignment/re-assignment component 406, service provisioning component 408, memory 410 and/or processor 412 can be electrically and/or communicatively coupled to one another to perform one or more functions of control device 400.

FIG. 5 illustrates an example, non-limiting block diagram of a mobile device that can employ mobile device-assisted mobility enhancement to improve user plane interruption time in accordance with one or more embodiments described herein. Mobile device 104 can comprise a communication component 502, beam selection component 504, DU determination component 506, QoS component 508, memory 510 and/or processor 512. In various embodiments, one or more of communication component 502, beam selection component 504, DU determination component 506, QoS component 508, memory 510 and/or processor 512 can be electrically and/or communicatively coupled to one another to perform one or more functions of mobile device 104.

In some embodiments, the communication component 502 of the mobile device 104 can transmit to the communication component 502 of the control device 400 an identity of the mobile device 104 and/or information indicating a second beam to which the mobile device 104 has communicatively coupled. In the embodiments described herein, the communication component 502 can perform the transmission in an RLI of the RRC connection request in message 3 of the RACH procedure. The communication component 502 can provide the communication via a new beam selected by the mobile device 104. Thus, the communication component 502 is configured to transmit and/or receive information via one or more different beams from time to time.

In some embodiments, the mobile device 104 can measure signal strength and/or power of one or more different beams. If the connection for an original or first beam is lost, the beam selection component 504 can measure signal strength and/or power of a second, new beam. The mobile device 104 can select a new beam employing the beam selection component 504 based on whether the new beam is sufficiently strong (e.g., exceeds or meets a defined signal strength or power threshold, for example). In some embodiments, based on the methods described herein, the mobile device 104 can also make a determination regarding the DU associated with the new selected beam using DU determination component and explicitly indicate such information to the network 102 (and/or the BS device 103). In some embodiments in which the mobile device 104 is concurrently receiving different services over different beams, and at least one service is lost and a new beam must be located by the mobile device, the QoS component 508 can determine the QoS for the service that is lost and/or facilitate selection of one or more new beams based on the QoS for the service. The memory 510 can store computer executable instructions that can be executed by the processor 512 to perform one or more functions, including, but not limited to, QoS determination for a service, determination of a DU identity, initiation of measurement of a beam and the like.

In some embodiments, the communication component 402 of the control device 400 can receive the message identifying the mobile device 104 and the new beam. In embodiments in which the mobile device 104 is unable to determine and indicate the DU identity, the control device 400 can make such determination employing the DU determination component 404 (and using information such as quasi-colocation configuration information for the original and second beams, for example). If the control device 400 determines the DU for the second beam is different from the DU of the original beam, the assignment/re-assignment component 406 can assign the new beam to the mobile device and forward data lost to the mobile device (the data may have been lost while being forwarded to the original beam notwithstanding the connection had been lost between the mobile device 104 and the original beam). The control device 400 can determine which beam to assign to the mobile device 104 notwithstanding the mobile device-requested in some embodiments as the service provisioning component 408 can determine the beam (and/or corresponding TRP) that can provide the level of QoS requested with or configured for the particular service. The memory 410 can store computer executable instructions that can be executed by the processor 412 to perform one or more functions, including, but not limited to, assignment/re-assignment, QoS determination for a service, determination of a DU identity and the like.

FIGS. 6, 7, 8 and 9 illustrate flowcharts of methods facilitating mobile device-assisted mobility enhancement to improve user plane interruption time in a wireless communication system in accordance with one or more embodiments described herein. At 602, method 600 can comprise determining, by a mobile device comprising a processor and that was communicatively coupled to a network via a first distribution device of distribution devices, that a connection, via a first beam, between the mobile device and a base station device of the network fails to satisfy a defined condition.

At 604, method 600 can comprise selecting, by the mobile device, a second beam associated with a second distribution device of the distribution devices and to which to connect based on the second beam being determined to satisfy the defined condition. At 606, method 600 can transmitting, by the mobile device, via the second beam, to the base station device, a radio link interruption message comprising re-assignment information to facilitate re-assignment of the mobile device to the second beam from being assigned to the first beam, wherein the transmitting is performed via a mobile device identification message of a random access procedure to facilitate the re-assignment from the first beam to the second beam, wherein the mobile device identification message identifies the mobile device, and wherein the transmitting is performed based on the first distribution device being determined to be different from the second distribution device.

In some embodiments, the re-assignment information further comprises information indicative of the selecting of the second beam. In some embodiments, the re-assignment information further comprises security information indicative of a security key that the mobile device employs for decryption.

In some embodiments, the defined condition comprises a condition where a signal strength is determined to be greater than a defined threshold. In some embodiments, the first beam enables provision of a first service to the mobile device, wherein the first service is associated with a defined level of quality of service, and wherein the method further comprises: in response to the transmitting the radio link interruption message, receiving, by the mobile device, an assignment to the second beam, the second distribution device and a transmission point device associated with the second distribution device, wherein the assignment to the second beam is for receipt of the first service based on a determination that the transmission point device enables the provision of the defined level of quality of service. In some embodiments, the method comprises receiving, by the mobile device concurrently with the provision of the first service to the mobile device, a second service associated with a second defined level of quality of service during the receipt of the first service, wherein the receiving the second service is via a third beam distinct from the first beam and the second beam.

Figure 7:
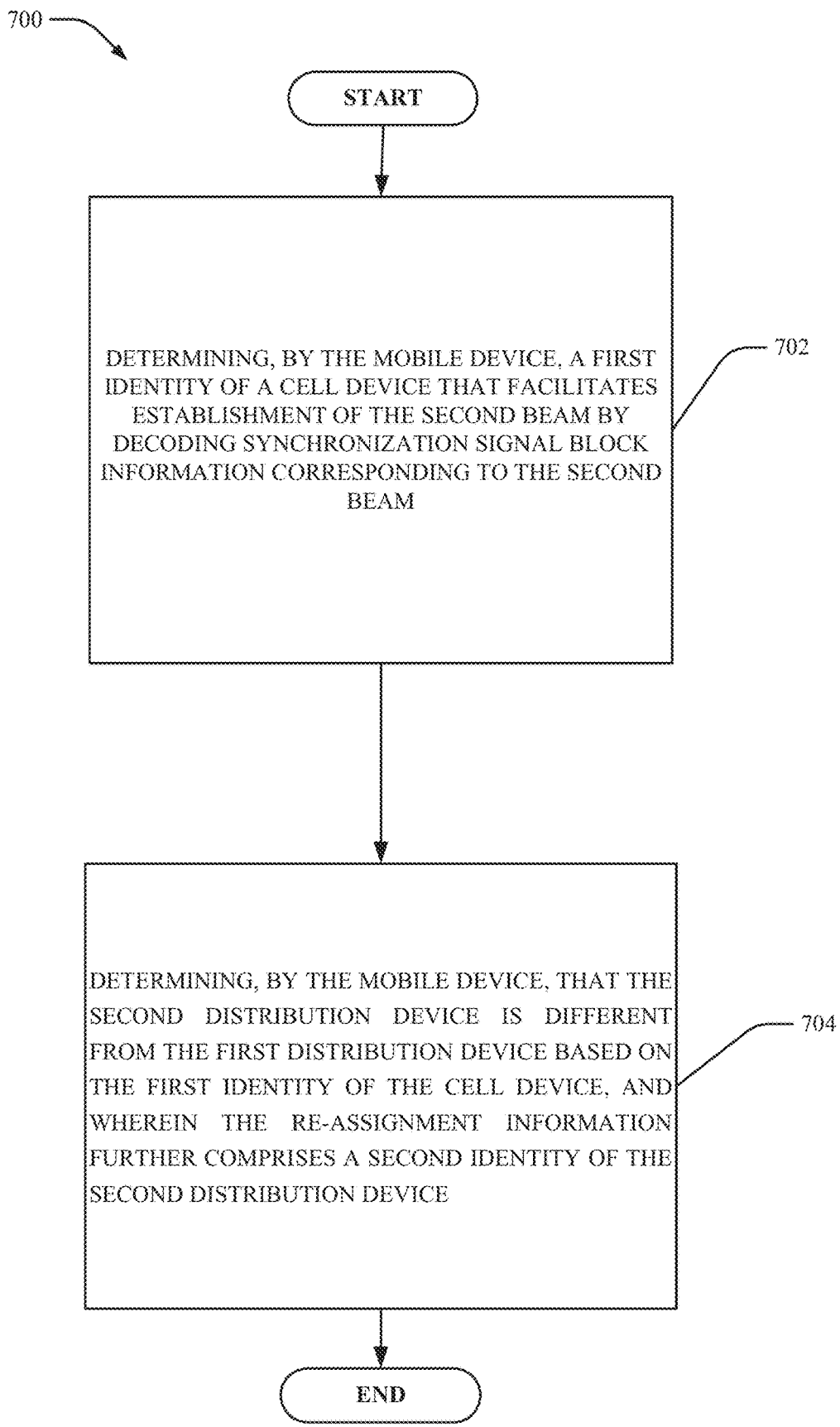

Turning now to FIG. 7, at 702, method 700 can comprise determining, by the mobile device, a first identity of a cell device that facilitates establishment of the second beam by decoding synchronization signal block information corresponding to the second beam. At 704, method 700 can comprise determining, by the mobile device, that the second distribution device is different from the first distribution device based on the first identity of the cell device, and wherein the re-assignment information further comprises a second identity of the second distribution device.

Figure 8:
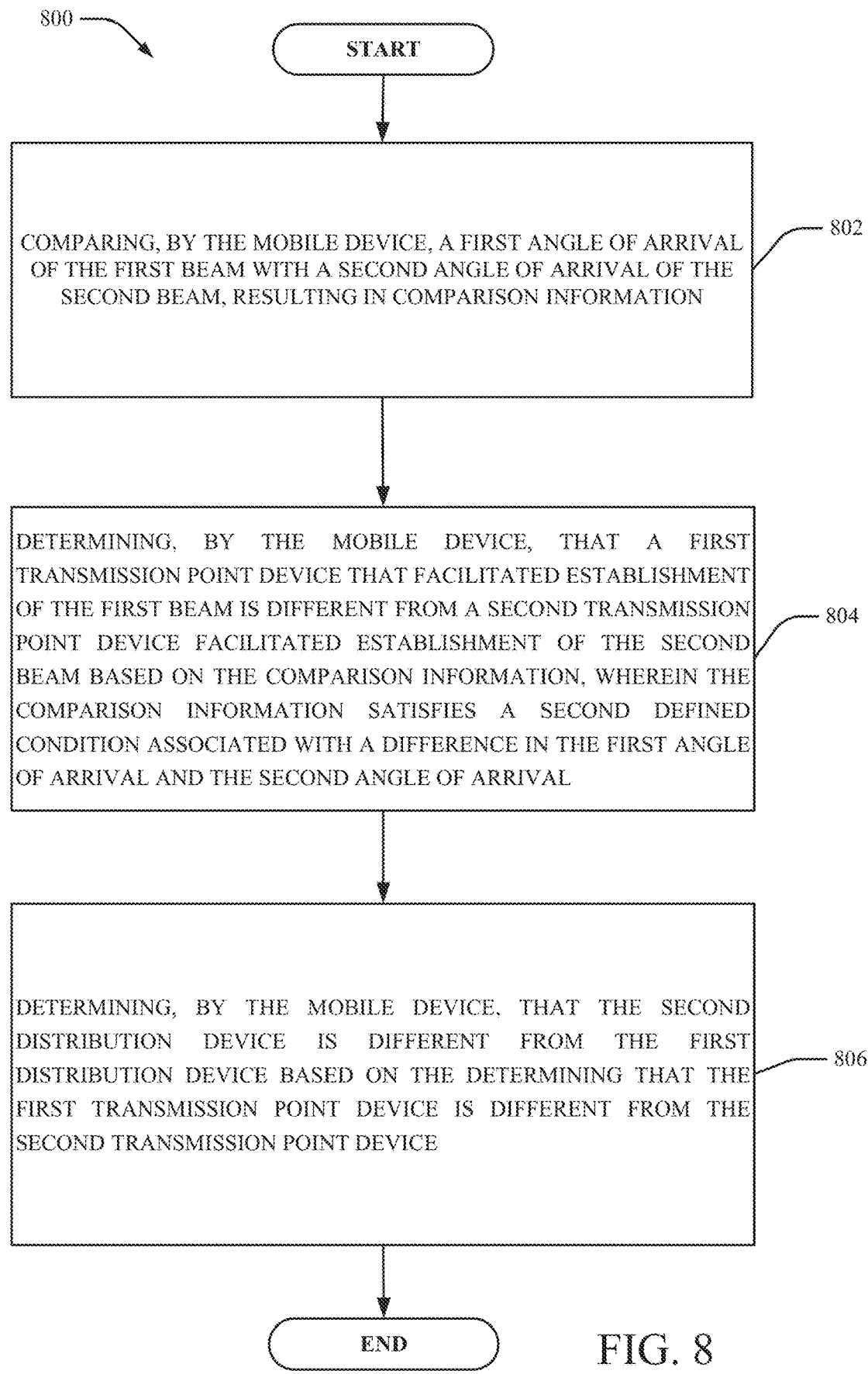

Turning now to FIG. 8, at 802, method 800 can comprise comparing, by the mobile device, a first angle of arrival of the first beam with a second angle of arrival of the second beam, resulting in comparison information. At 804, method 800 can comprise determining, by the mobile device, that a first transmission point device that facilitated establishment of the first beam is different from a second transmission point device facilitated establishment of the second beam based on the comparison information, wherein the comparison information satisfies a second defined condition associated with a difference in the first angle of arrival and the second angle of arrival.

At 806, method 800 can comprise determining, by the mobile device, that the second distribution device is different from the first distribution device based on the determining that the first transmission point device is different from the second transmission point device.

In some embodiments, although not shown, a method can comprise estimating, by the mobile device, a location of an angle of arrival from which the second beam originates. The method can also comprise determining, by the mobile device, that the location of the angle of arrival is outside of a configured range for beams for use by the mobile device. The method can also comprise determining, by the mobile device, that the second distribution device is different from the first distribution device based on the determining the location of the angle of arrival is outside of the configured range for beams for the mobile device.

In some embodiments, although not shown, a method can comprise comparing, by the mobile device, a first configuration of the first beam and a second configuration of the second beam. The method can also comprise determining, by the mobile device, that the second distribution device is different from the first distribution device based on the comparing indicating that the first configuration is different from the second configuration.

Figure 9:
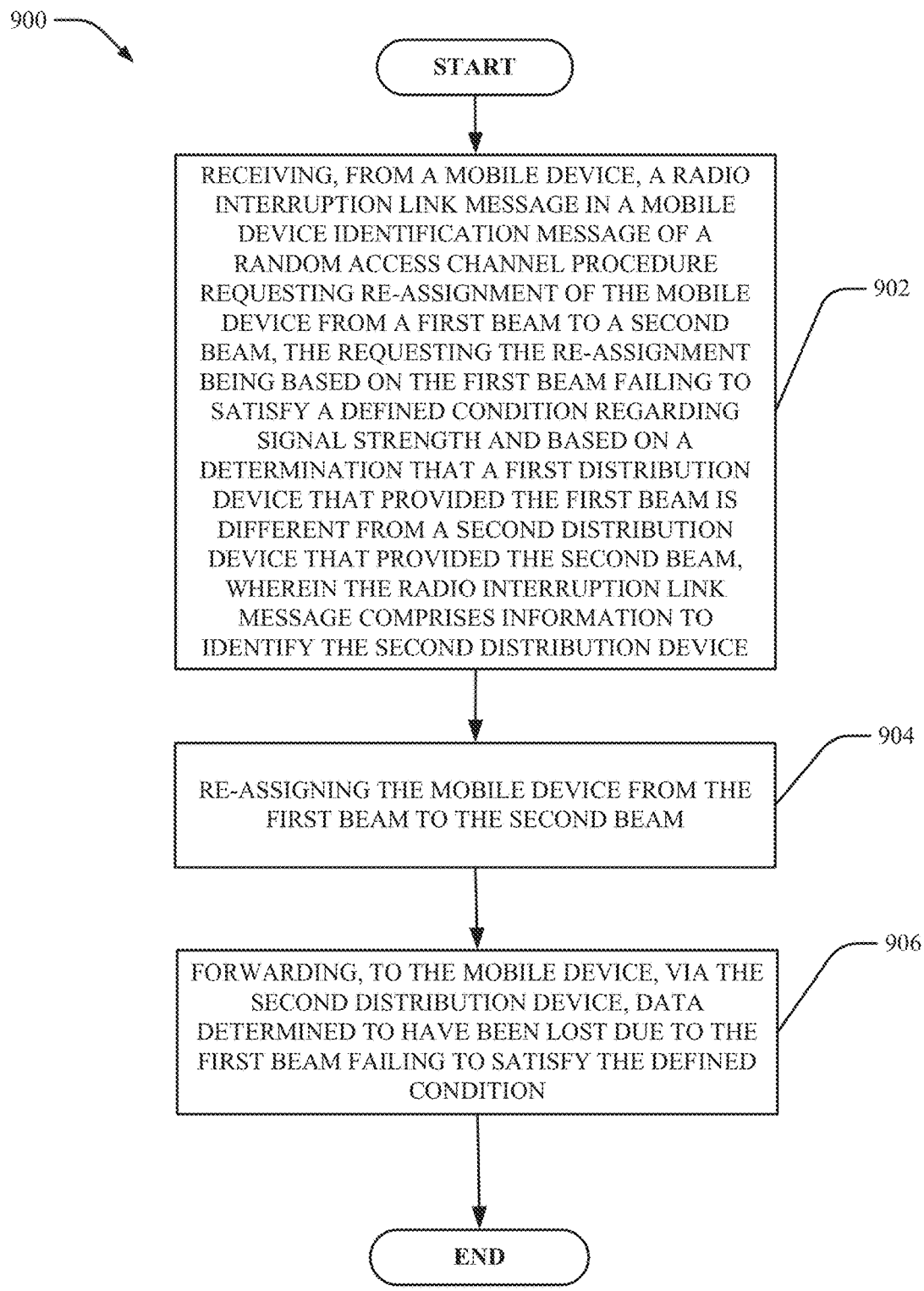

Turning now to FIG. 9, at 902, method 900 can comprise receiving, from a mobile device, a radio interruption link message in a mobile device identification message of a random access channel procedure requesting re-assignment of the mobile device from a first beam to a second beam, the requesting the re-assignment being based on the first beam failing to satisfy a defined condition regarding signal strength and based on a determination that a first distribution device that provided the first beam is different from a second distribution device that provided the second beam, wherein the radio interruption link message comprises information to identify the second distribution device. At 904, method 900 can comprise re-assigning the mobile device from the first beam to the second beam. At 906, method 900 can comprise forwarding, to the mobile device, via the second distribution device, data determined to have been lost due to the first beam failing to satisfy the defined condition.

In some embodiments, the data comprises data determined to have been lost for a first service provided to the mobile device by the network device, wherein the second beam is associated with a first transmission point, wherein the first service has a first level of quality of service, and wherein the method operations further comprise: transmitting, to the mobile device, via a third beam, second data associated with a second service having a second level of quality of service that is different from the first level of quality of service, wherein the forwarding and the transmitting are performed concurrently, and wherein the third beam is associated with a second transmission point other than the first transmission point.

In some embodiments, although not shown, can also comprise determining that the second distribution device is different from the first distribution device based on determining that a transmission point for the first beam is different from a second transmission point for the second beam. In some embodiments, although not shown, the method 900 can comprise determining that the second distribution device is different from the first distribution device based on determining that a first configuration for the first beam is different from a second configuration for the second beam.

Figure 10:
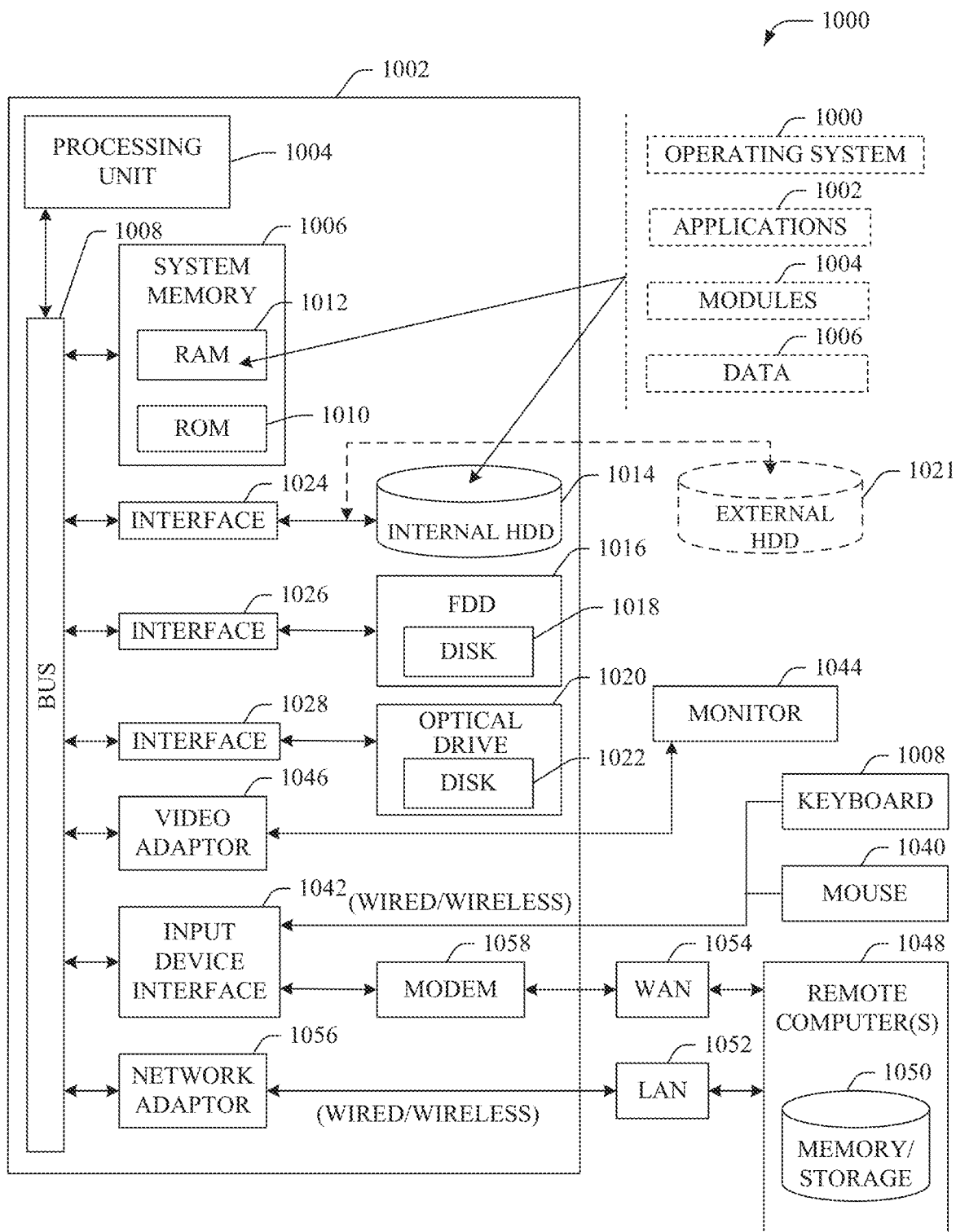
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, base station device 103 or mobile device 104 (or a component of base station device 103 or mobile device 104).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EE-PROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based protocols for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier (s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a mobile device comprising a processor, that a connection, via a first beam, between the mobile device and a base station device of a network fails to satisfy a defined condition, wherein the mobile device was communicatively coupled to the network via a first distribution device of distribution devices;
   based on a second beam being determined to satisfy the defined condition, selecting, by the mobile device, the second beam to which to connect and that is associated with a second distribution device of the distribution devices;
   transmitting, by the mobile device, via the second beam to the base station device, a radio link interruption message comprising re-assignment information to facilitate re-assignment of the mobile device to the second beam from being assigned to the first beam, wherein the mobile device sends, via the second beam, the radio link interruption message to the base station device about a failure of the connection and requests that the base station device add a channel so that a communication lost due to a previous failure of the first beam is able to be resumed, wherein packets of the communication, which have been delayed or are unacknowledged and that were sent via the first beam and lost, are able to be forwarded or re-delivered to the mobile device via the second beam, wherein the first beam enables provision of a first service to the mobile device, wherein the first service is associated with a defined level of quality of service, wherein the re-assignment information represents decryption key data that is used by the mobile device to decrypt the packets of the communication that were delayed or are unacknowledged and that initially were sent via the first beam and are subsequently forwarded or re-delivered to the mobile device via the second beam, and wherein the re-assignment information comprises information indicative of the selecting of the second beam;

determining a first identity of a cell device that facilitates establishment of the second beam by decoding synchronization signal block information corresponding to the second beam;

determining that the second distribution device is different from the first distribution device based on the first identity of the cell device, wherein the re-assignment information further comprises a second identity of the second distribution device; and in response to the transmitting the radio link interruption message, receiving, by the mobile device, an assignment to the second beam, the second distribution device and a transmission point device associated with the second distribution device, wherein the assignment to the second beam is for receipt of the first service based on a determination that the transmission point device enables the provision of the defined level of quality of service.

2. The method of claim 1, further comprising:

comparing, by the mobile device, a first angle of arrival of the first beam with a second angle of arrival of the second beam, resulting in comparison information.

3. The method of claim 1, further comprising:

estimating, by the mobile device, a location of an angle of arrival from which the second beam originates;

determining, by the mobile device, that the location of the angle of arrival is outside of a configured range for beams for use by the mobile device; and determining, by the mobile device, that the second distribution device is different from the first distribution device based on the determining the location of the angle of arrival is outside of the configured range for beams.

4. The method of claim 1, further comprising:

comparing, by the mobile device, a first configuration of the first beam and a second configuration of the second beam; and determining, by the mobile device, that the second distribution device is different from the first distribution device based on a result of the comparing indicating that the first configuration is different from the second configuration.

5. The method of claim 1, wherein the defined condition comprises a condition where a signal strength is determined to be greater than a defined threshold.

6. The method of claim 1, wherein the first beam enables provision of a first service to the mobile device, and wherein the first service is associated with the defined level of quality of service.

7. The method of claim 6, further comprising:

in response to the transmitting the radio link interruption message, receiving, by the mobile device, an assignment to the second beam, the second distribution device and a transmission point device associated with the second distribution device.

8. The method of claim 7, wherein the assignment to the second beam is for receipt of the first service based on the determination that the transmission point device enables the provision of the defined level of quality of service.

9. A non-transitory machine-readable medium, comprising executable instructions that, when executed by a processor of a mobile device, facilitate performance of operations, comprising:

determining that a connection, via a first beam, between the mobile device and a base station device of a network fails to satisfy a defined condition, wherein the mobile device was communicatively coupled to the network via a first distribution device of distribution devices;

based on a second beam being determined to satisfy the defined condition, selecting the second beam to which to connect, wherein the second beam is associated with a second distribution device of the distribution devices;

transmitting, via the second beam to the base station device, a radio link interruption message comprising re-assignment information to facilitate re-assignment of the mobile device to the second beam from being assigned to the first beam, wherein the mobile device sends, via the second beam, the radio link interruption message to the base station device about a failure of the first beam and requests that the base station device add a channel so that a communication lost due to a previous failure of the first beam is able to be resumed, wherein packets of the communication, which have been delayed or are unacknowledged and that were sent via the first beam and lost, are able to be forwarded or re-delivered to the mobile device via the second beam, wherein the first beam enables provision of a first service to the mobile device, wherein the first service is associated with a defined level of quality of service, wherein the re-assignment information represents decryption key data that is used by the mobile device to decrypt the packets of the communication that were delayed or are unacknowledged and that initially were sent via the first beam and are subsequently forwarded or re-delivered to the mobile device via the second beam, and wherein the re-assignment information comprises information indicative of the selecting of the second beam;

determining a first identity of a cell device that facilitates establishment of the second beam by decoding synchronization signal block information corresponding to the second beam;

determining that the second distribution device is different from the first distribution device based on the first identity of the cell device, wherein the re-assignment information further comprises a second identity of the second distribution device; and in response to the transmitting the radio link interruption message, receiving, by the mobile device, an assignment to the second beam, the second distribution device and a transmission point device associated with the second distribution device, wherein the assignment to the second beam is for receipt of the first service based on a determination that the transmission point device enables the provision of the first service at the defined level of quality of service.

10. The non-transitory machine-readable medium of claim 9, wherein the operations further comprise:

comparing a first angle of arrival of the first beam with a second angle of arrival of the second beam.

11. The non-transitory machine-readable medium of claim 9, wherein the operations further comprise:
estimating a location of an angle of arrival from which the second beam originates;
determining that the location of the angle of arrival is outside of a configured range for beams for use by the mobile device; and
determining that the second distribution device is different from the first distribution device based on the determining the location of the angle of arrival is outside of the configured range for beams for the use by the mobile device.

12. The non-transitory machine-readable medium of claim 9, wherein the operations further comprise:
comparing a first configuration of the first beam and a second configuration of the second beam; and
determining that the second distribution device is different from the first distribution device based on the comparing indicating that the first configuration is different from the second configuration.

13. The non-transitory machine-readable medium of claim 9, wherein the defined condition comprises a condition where a signal strength is determined to be greater than a defined threshold.

14. A mobile device, comprising:
a processor; and
a memory that stores executable instructions that, when executed by the processor, facilitate performance of operations, comprising:
determining that a connection fails to satisfy a defined condition, wherein the connection is via a first beam between the mobile device and a base station device of a network, and wherein the mobile device was communicatively coupled to the network via a first distribution device of distribution devices;
based on a second beam being determined to satisfy the defined condition, selecting the second beam to which to connect, wherein the second beam is associated with a second distribution device of the distribution devices;
transmitting, via the second beam to the base station device, a radio link interruption message comprising re-assignment information to facilitate re-assignment of the mobile device to the second beam from being assigned to the first beam, wherein the mobile device sends, via the second beam, the radio link interruption message to the base station device about a failure of the first beam and requests that the base station device add a channel so that a communication lost due to a previous failure of the first beam is able to be resumed, wherein packets of the communication, which have been delayed or are unacknowledged and that were sent via the first beam and lost, are able to be forwarded or re-delivered to the mobile device via the second beam, wherein the first beam enables provision of a first service to the mobile device, and wherein the first service is associated with a defined level of quality of service, wherein the re-assignment information represents decryption key data that is used by the mobile device to decrypt the packets of the communication that were delayed or are unacknowledged and that initially were sent via the first beam and are subsequently forwarded or re-delivered to the mobile device via the second beam, and wherein the re-assignment information comprises information indicative of the selecting of the second beam;
determining a first identity of a cell device that facilitates establishment of the second beam by decoding synchronization signal block information corresponding to the second beam;
determining that the second distribution device is different from the first distribution device based on the first identity of the cell device, wherein the re-assignment information further comprises a second identity of the second distribution device; and
in response to the transmitting the radio link interruption message, receiving, by the mobile device, an assignment to the second beam, the second distribution device and a transmission point device associated with the second distribution device, wherein the assignment to the second beam is for receipt of the first service based on a determination that the transmission point device enables the provision of the first service at the defined level of quality of service.

15. The mobile device of claim 14, wherein the defined condition comprises a condition where a signal strength is determined to be greater than a defined threshold.

16. The mobile device of claim 14, wherein the operations further comprise comparing a first angle of arrival of the first beam with a second angle of arrival of the second beam.

17. The mobile device of claim 14, wherein the operations further comprise estimating a location of an angle of arrival from which the second beam originates.

18. The mobile device of claim 17, wherein the operations further comprise determining that the location of the angle of arrival is outside of a configured range for beams for use by the mobile device.

19. The mobile device of claim 18, wherein the operations further comprise determining that the second distribution device is different from the first distribution device based on determining that the angle of arrival is outside of the configured range for beams for the use by the mobile device.

20. The mobile device of claim 14, wherein the operations further comprise determining that the second distribution device is different from the first distribution device based on a comparison that indicates that a first configuration of the first beam is different from a second configuration of the second beam.

* * * * *